United States Patent
M et al.

(10) Patent No.: US 12,406,082 B2
(45) Date of Patent: Sep. 2, 2025

(54) SEGMENTING DATA ACCORDING TO DATA ACCESS PRIVILEGE GRANTS DURING STORAGE OF THE DATA IN A DATABASE

(71) Applicant: Kyndryl, Inc., New York, NY (US)

(72) Inventors: Nalini M, Chennai (IN); Viswanatha Krishnamurthy, Bengaluru (IN); Muniyandi Perumal Thevar, Madurai (IN); Veeresh Bushetti, Savanur (IN)

(73) Assignee: Kyndryl, Inc., New York, NY (US)

( * ) Notice: Subject to any disclaimer, the term of this patent is extended or adjusted under 35 U.S.C. 154(b) by 167 days.

(21) Appl. No.: 18/122,036

(22) Filed: Mar. 15, 2023

(65) Prior Publication Data
US 2024/0311504 A1  Sep. 19, 2024

(51) Int. Cl.
*G06F 21/62* (2013.01)
*G06F 21/60* (2013.01)

(52) U.S. Cl.
CPC ........ *G06F 21/6227* (2013.01); *G06F 21/604* (2013.01); *G06F 2221/2113* (2013.01)

(58) Field of Classification Search
CPC .... G06F 21/6227; G06F 21/604; G06F 21/21; G06F 21/6245; G06F 2221/2113
See application file for complete search history.

(56) References Cited

U.S. PATENT DOCUMENTS

| | | | |
|---|---|---|---|
| 8,271,527 B2 | 9/2012 | Frieder et al. | |
| 8,719,894 B2 | 5/2014 | McClain et al. | |
| 9,774,586 B1 | 9/2017 | Roche et al. | |
| 11,494,705 B1* | 11/2022 | Mauldin | G07F 17/32 |
| 2008/0168135 A1* | 7/2008 | Redlich | G06F 16/282 |
| | | | 709/204 |
| 2009/0254572 A1* | 10/2009 | Redlich | G06Q 10/10 |
| 2010/0250497 A1* | 9/2010 | Redlich | G06Q 10/06 |
| | | | 707/661 |
| 2016/0188898 A1 | 6/2016 | Karinta et al. | |
| 2017/0155686 A1 | 6/2017 | Yanacek et al. | |
| 2017/0193068 A1 | 7/2017 | Falkenberg | |
| 2018/0278614 A1 | 9/2018 | Miller et al. | |

(Continued)

FOREIGN PATENT DOCUMENTS

| | | |
|---|---|---|
| CA | 2649862 A1 | 12/2007 |
| EP | 1248178 B1 | 1/2004 |
| KR | 20220046870 A | 4/2022 |

*Primary Examiner* — Azizul Choudhury
(74) *Attorney, Agent, or Firm* — CANTOR COLBURN LLP; Erik Swanson

(57) ABSTRACT

A computer-implemented method, according to one embodiment, includes causing a trained artificial intelligence (AI) model to derive data access privilege grants before data is stored in a predetermined database, and segmenting the data according to the data access privilege grants during storage of the data in the predetermined database. Metadata that defines the data access privilege grants is stored with the segments of data. The method further includes receiving, from a first user device, a query requesting data stored in the predetermined database. At least some of the metadata is read to identify a segment of the data associated with a data access privilege grant associated with the query. The method further includes allowing the first user device to access the identified segment of data for fulfilling the query.

20 Claims, 15 Drawing Sheets

(56) References Cited

U.S. PATENT DOCUMENTS

| | | | |
|---|---|---|---|
| 2019/0327271 A1* | 10/2019 | Saxena | G06F 8/38 |
| 2020/0089900 A1* | 3/2020 | Butler | G06F 16/93 |
| 2021/0075795 A1 | 3/2021 | Liu et al. | |
| 2022/0156117 A1* | 5/2022 | Chen | G06N 20/20 |
| 2024/0089247 A1* | 3/2024 | Singh | H04L 9/50 |
| 2024/0311504 A1* | 9/2024 | M | G06F 21/6218 |

\* cited by examiner

| All role | All role | Role A | All role | Role D | All role | Role B | Role D | Role A | Role B | All role | Role D |
|---|---|---|---|---|---|---|---|---|---|---|---|
| All role | All role | Role A | All role | Role D | All role | Role B | Role D | Role A | Role B | All role | Role D |
| Role A | Role A | Role A | Role A | Role D | Role B | Role B | Role A | Role A | Role B | Role A | Role D |
| All role | All role | Role A | All role | Role D | All role | Role B | Role D | Role A | Role B | All role | Role D |
| Role D | Role D | Role A | Role D | Role D | All role | Role B | Role A | Role A | Role B | Role D | Role D |
| All role | All role | Role A | All role | Role D | All role | Role B | Role B | Role A | Role B | All role | Role D |
| Role B | Role B | Role A | Role B | Role D | Role B | Role B | Role C | Role A | Role B | Role B | Role D |
| Role C | Role C | Role A | Role C | Role D | Role C | Role B | Role C | Role A | Role B | Role C | Role D |

FIG. 5A

500
Rows →
Columns ↑

FIG. 5B

| | All role | All role | Role A | Role D | Role B | All role | Role C | Role B | Role D |
|---|---|---|---|---|---|---|---|---|---|
| All role | All role | All role | No access | No access | Role B | All role | No access | Role B | No access |
| Role A | No access | No access | No access | No access | Role B | No access | No access | Role B | No access |
| All role | All role | All role | No access | No access | Role B | All role | No access | Role B | No access |
| Role D | No access | No access | No access | No access | Role B | No access | No access | Role B | No access |
| All role | All role | All role | No access | No access | Role B | Role B | No access | Role B | No access |
| Role B | Role B | Role B | No access | No access | Role B | No access | No access | Role B | No access |
| Role C | No access | No access | No access | No access | Role B | No access | No access | Role B | No access |

Columns ↑

Rows →

| | All role | Role A | All role | Role D | All role | Role B | Role C | Role B | All role | Role D |
|---|---|---|---|---|---|---|---|---|---|---|
| All role | All role | No access | All role | Role D | All role | Role B | No access | Role B | All role | Role D |
| Role A | No access | No access | No access | No access | No access | No access | No access | No access | No access | No access |
| All role | All role | No access | All role | Role D | All role | Role B | No access | Role B | All role | Role D |
| Role D | Role D | No access | Role D | Role D | Role D | Role B | No access | Role B | Role D | Role D |
| All role | All role | No access | All role | Role D | All role | Role B | No access | Role B | All role | Role D |
| Role B | Role B | No access | Role B | Role B | Role B | Role B | No access | Role B | Role B | Role B |
| Role C | No access | No access | No access | No access | No access | No access | No access | No access | No access | No access |

734

| Rows | Name | Age | Salary |
|---|---|---|---|
| row id1 | test1 | 30 | 20000 |
| row id2 | test2 | 55 | 50000 |
| row id3 | test3 | 22 | 10000 |

FIG. 7B

738 row id1: test1, 30, 20000 row id2: test2, 55, 50000 row id3: test3, 22, 10000

FIG. 7C

740 row id1: test1, 30, 20000 row id2: test2, 55, 50000 row id3: test3, 22, 10000

| Name | Type | FieldNames | Privileges | data | roleID |
|---|---|---|---|---|---|
| user | Int | age, old | all users | > 40 | R1 |
| admin | String | salary, incentive | admin | > 2M | R2 |

796

| Rows | Name:R1 | Age:R1 | Salary:R2 |
|---|---|---|---|
| row id1 | test1 | 30 | 20000 |
| row id2 | test2 | 55 | 50000 |
| row id3 | test3 | 22 | 10000 |

900

| Access to private firm only | Access to government | Access to family members |
|---|---|---|
| Access to friends | Access to all | Access to no one |
| Access to all | Access to workforce | Access to Me only |

| PG name | Access |
|---|---|
| Me only | Owner |
| All | Everyone |
| Family | Tagged as family by the owner |
| Workforce | Tagged as co-worker |
| Private firm | Private firms tagged by the owner |
| Government | Government |

FIG. 9B

SEGMENTING DATA ACCORDING TO DATA ACCESS PRIVILEGE GRANTS DURING STORAGE OF THE DATA IN A DATABASE

BACKGROUND

The present invention relates to data repositories, and more specifically, this invention relates to segmenting data according to data access privilege grants during storage of the data in a database and thereafter using metadata stored with the segments of data to fulfill queries for the data.

Data storage repositories often receive client data, e.g., data of a corporation, data of a user utilizing cloud storage, backup data for a production site, etc. This received data is then stored on the data repositories. Intelligent processing is typically performed by data management applications on the data stored on the data repositories to control access to the data of the different clients. Critical decisions such as defining roles and a respective scope, role-based access control (RBAC) schema, etc., are just some of the techniques considered and performed on the data repositories after the data is stored in such a database.

SUMMARY

A computer-implemented method, according to one embodiment, includes causing a trained artificial intelligence (AI) model to derive data access privilege grants before data is stored in a predetermined database, and segmenting the data according to the data access privilege grants during storage of the data in the predetermined database. Metadata that defines the data access privilege grants is stored with the segments of data. The method further includes receiving, from a first user device, a query requesting data stored in the predetermined database. At least some of the metadata is read to identify a segment of the data associated with a data access privilege grant associated with the query. The method further includes allowing the first user device to access the identified segment of data for fulfilling the query.

A computer program product, according to another embodiment, includes a computer readable storage medium having program instructions embodied therewith. The program instructions are executable by a computer to cause the computer to perform the foregoing method.

A system, according to another embodiment, includes a hardware processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 5A is a table, in accordance with one embodiment of the present invention.

FIG. 5B is a table, in accordance with one embodiment of the present invention.

FIG. 5C is a table, in accordance with one embodiment of the present invention.

FIGS. 7B-7J illustrate portions of the flowchart of the method of FIG. 7A, in accordance with several embodiments.

FIG. 9A is a representation, in accordance with one embodiment of the present invention.

FIG. 9B is a representation, in accordance with one embodiment of the present invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for segmenting data according to data access privilege grants during storage of the data in a database and thereafter using metadata stored with the segments of data to fulfill queries for the data.

In one general embodiment, a computer-implemented method includes causing a trained artificial intelligence (AI) model to derive data access privilege grants before data is stored in a predetermined database and segmenting the data according to the data access privilege grants during storage of the data in the predetermined database. Metadata that defines the data access privilege grants is stored with the segments of data. The method further includes receiving, from a first user device, a query requesting data stored in the predetermined database. At least some of the metadata is read to identify a segment of the data associated with a data access privilege grant associated with the query. The method further includes allowing the first user device to access the identified segment of data for fulfilling the query.

In another general embodiment, a computer program product includes a computer readable storage medium having program instructions embodied therewith. The program instructions are executable by a computer to cause the computer to perform the foregoing method.

In another general embodiment, a system includes a hardware processor, and logic integrated with the processor, executable by the processor, or integrated with and executable by the processor. The logic is configured to perform the foregoing method.

Figure 1:
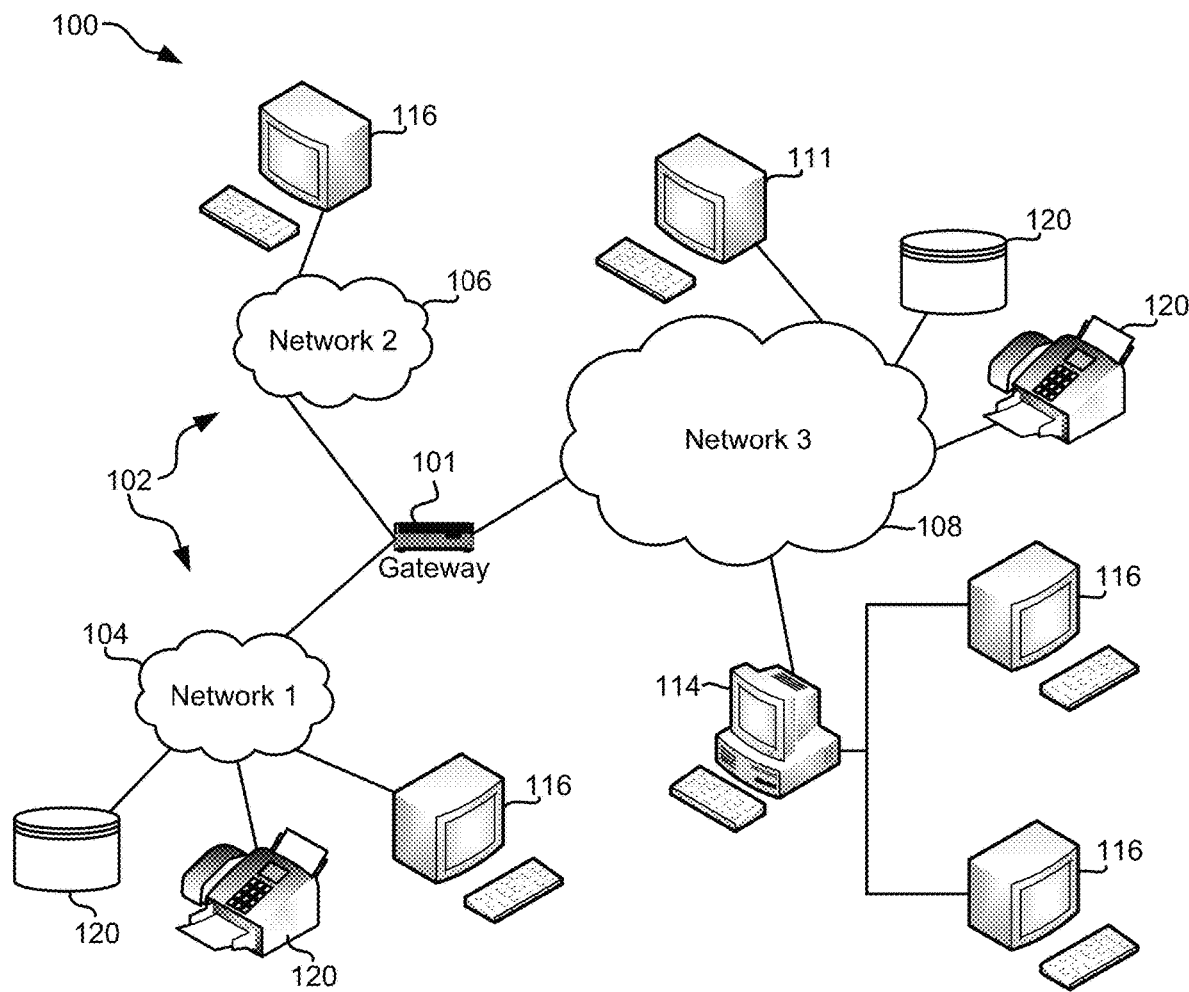
FIG. 1 is a diagram of a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to, a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment (IBM and all IBM-based trademarks and logos are trademarks or registered trademarks of International Business Machines Corporation and/or its affiliates), a UNIX® system which virtually hosts a known operating system environment, an operating system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
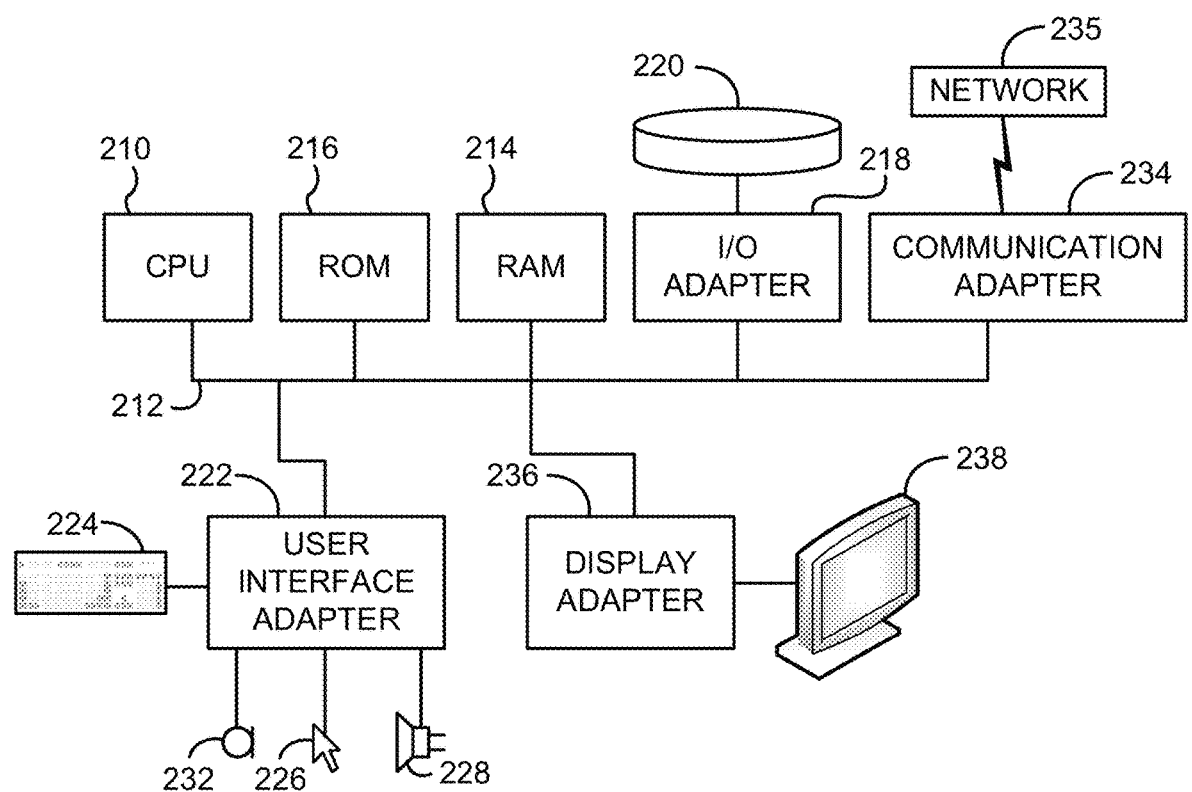
FIG. 2 is a diagram of a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using extensible Markup Language (XML), C, and/or C++ language, or other programming languages, along with an object-oriented programming methodology. Object-oriented programming (OOP), which has become increasingly used to develop complex applications, may be used.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

As previously mentioned elsewhere herein, data storage repositories often receive client data, e.g., data of a corporation, data of a user utilizing cloud storage, backup data for a production site, etc. This received data is then stored on the data repositories. Intelligent processing is typically performed by data management applications on the data stored on the data repositories to control access to the data of the different clients. Critical decisions such as defining roles and a respective scope, role-based access control (RBAC) schema, etc., are just some of the techniques considered and performed on the database after the data is stored in such a database. These conventional techniques for storing and controlling access of data are problematic in that they are inefficient and time consuming. For example, these conventional techniques define privileges and respective access levels only after data is stored in a database, the data is stored to the database irrespective of privileges. Because of this, considerable full-time equivalent (FTE) hours are spent in scheming a database that includes the database in order to suit business requirements. More specifically, often times, manual sorting of data is performed, e.g., by an admin of the database, in conjunction with relatively extensive amounts of processing operations in order to first determine the different categories of data that are stored in the database, and then determine different rules in order to control the different categories of data. This often leads to delayed utilization of data repositories, which is frustrating to customers relying on such data repositories. Furthermore, relatively crucial information is often exposed as a result of these conventional techniques, as an organization that owns such data is unable to cause a restriction of data at a columnar or row level of the database in which the data is stored. Accordingly, in summary, existing techniques for using a database are manual, time consuming and also subject to the knowledge of an individual that the database relies on for leading a data access strategy. Furthermore, this access is primarily handled at a table and/or database level only after the database has been designed and data has been stored thereon.

In sharp contrast to the deficiencies of the conventional approaches described above, the novel techniques of various embodiments and approaches described herein include predefined categories of privilege grants being inbuilt within a database. More specifically, categories of privilege grants that are relevant to all domains and sectors are predetermined and thereafter incorporated into storage operations for storing data in a database of the database. A plug and play approach is enabled where organizations are enabled to correlate roles of their respective organizations to the inherent structure in the database. This way, an ability is enabled to exercise control at column and row level of data stored in the database, as opposed to merely being confined at table level. For example, consider an employee table having 1000 rows, but only 100 rows are related to managers, and a remaining 900 of the rows are related to clerks. Assuming that the manager uses a user device to query the database, the manager is granted access to only the 100 rows related to managers, while a clerk that uses a user device to query the database is only granted access to the 900 rows related to clerks.

Figure 3:
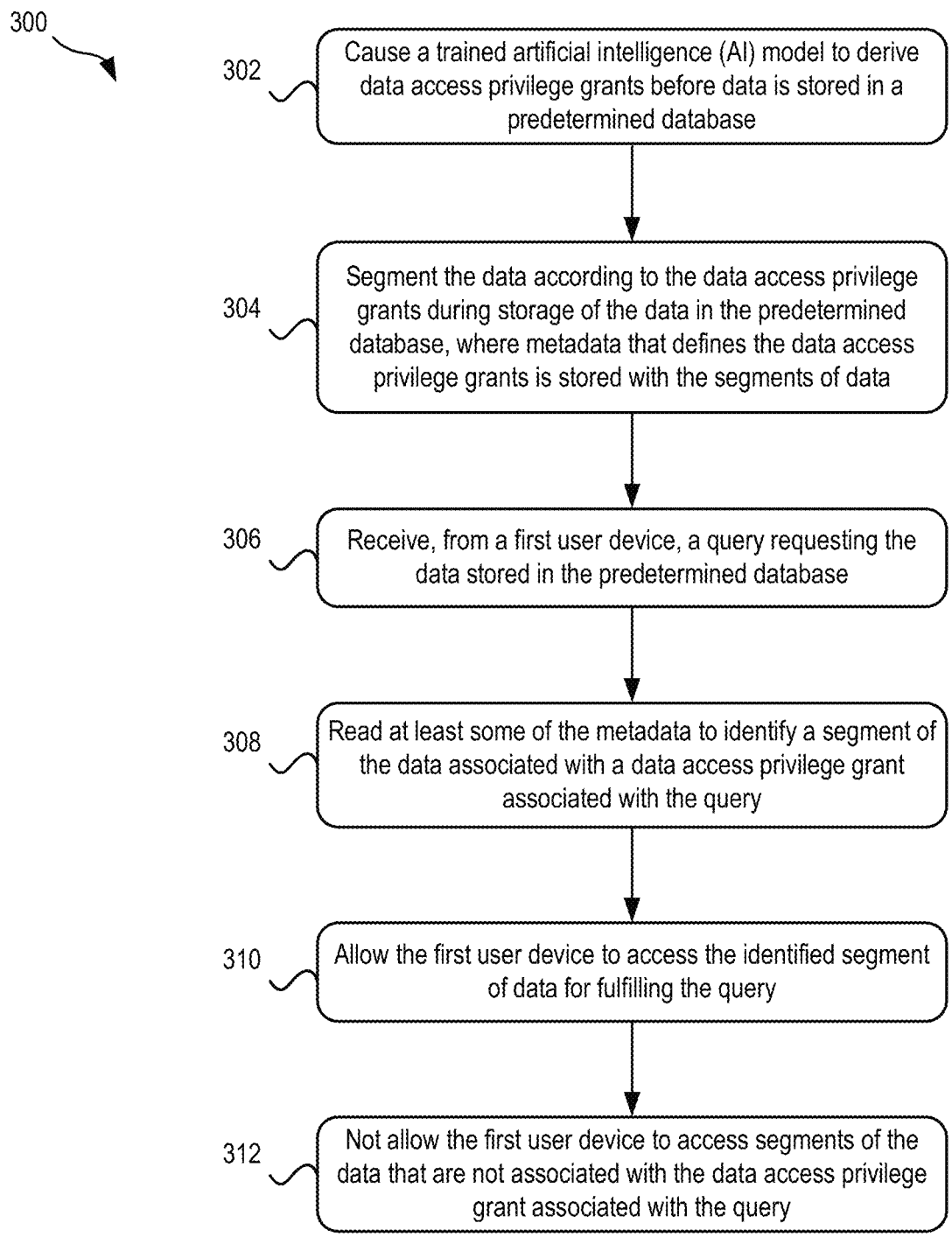
FIG. 3 is a flowchart of a method, in accordance with one embodiment of the present invention.

Now referring to FIG. 3, a flowchart of a method 300 is shown, according to one embodiment. The method 300 may be performed in accordance with the present invention in any of the environments depicted in FIGS. 1-10, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may be performed in any network in which data is being stored in a database. The database may, in some approaches, include storage that is located on a single storage device, e.g., a hard drive, a magnetic recording tape, a RAM, etc. In some other approaches, the database may include storage that is located across a plurality of different storage devices, e.g., where the plurality of different storage devices are considered a single logical storage device. It should be noted that various operations described below refer to use of a "database." However, in some alternate approaches, a data repository may be used in order to store the data with metadata, e.g., see operation 304.

Operation 302 includes causing a trained artificial intelligence (AI) model to derive data access privilege grants before data is stored in a predetermined database. For context, the "data access privilege grants" are parameters that define characteristics of data. It should be prefaced that in embodiments and approaches described herein, any parameters and/or use of user data, e.g., see "profile information" and "demographic information" elsewhere below, is preferably only determined and used subsequent to a user granting permission for their data to be considered. More specifically, this permission is preferably obtained in such a way that the user has the opportunity to consider and review details of how their information will be used (to assist the user in making an informed decision), and thereafter presented with an option to opt-in, e.g., an expressly performed opt-in selection. Thereafter, the user is preferably reminded of their opt-in, and ongoingly presented with features, e.g., output for display on a user device associated with the user, that relatively easily allow the user to retract their previous election to opt-in. Note that these features may be presented to the user in any one or more formats, e.g., audibly, visually, braille, in multiple languages, etc. For example, the user may be presented with an unambiguous opt-out selection feature which, if elected by the user, terminates collection and use of data associated with the user, erases previously used data associated with the user, and notifies the user of the course of action taken to respect the user's selection of the opt-out selection feature. In the event that the user does not want to have their data used in one or more of the operations described herein, this decision is respected, and the user is preferably not again presented with such an option unless the user thereafter requests to reconsider the opt-in feature, e.g., based on a change in their decision. Various parameters that define characteristics of data are provided below for purposes of an example.

According to some illustrative approaches, the data access privilege grants may be based on parameters including predetermined data attributes, e.g., a creation date of data, a size of the data, whether or not data is encrypted, a frequency that data exists in a predetermined data location, etc. In some other approaches, the data access privilege grants may be based on parameters including predetermined profile information of a data requestor, e.g., credentials held by the data requestor, a user device used to request data, usernames, strength of a password used by the user, experience with a predetermined subject and/or task, etc. Predetermined demographic information, e.g., age, salary, job title, etc., of a data requestor may additionally and/or alternatively be a parameter that the data access privilege grants are based on. In some other approaches, the data access privilege grants may be on parameters including a relative sensitivity of associated data, e.g., encryption requirements as specified by an owner of the data, whether or not the information is publicly available, government data, password protected data, etc.

Rules for deriving the data access privilege grants before data is stored in a predetermined database may, in some approaches, be based on preferences of owners of the data.

For example, owners of the data may specify, e.g., in received information, one or more data access privilege grants that must be applied to a predetermined portion of the data in order for the customer to allow the predetermined portion of the data to be stored in the predetermined database. Of course, customer preferences may change over time, and therefore these data access privilege grants may be modified over time, e.g., in response to receiving an indication of an update of customer preferences, and thereby applied to data that is thereafter stored to the predetermined database.

The trained AI model, which may be used for performing one or more of the operations described herein, may be implemented in an AI-based data stewardship domain agnostic echo-system. In some approaches, the trained AI model may be caused, e.g., instructed, to derive data sensitivity in real-time and create access privilege grants. Note that these access privilege grants are preferably created before data is stored in the predetermined database. Furthermore, method 300 may act as a data steward controller wrapper that sits between a user interface and an interface of the database.

In some approaches, the AI model may first be trained to derive the data access privilege grants. One or more of these approaches may include training the AI model using a predetermined training set of data. For example, a predetermined training data set may be applied to an initial and untrained version of the AI model with an instruction that the initial and untrained version of the AI model is to attempt to estimate data access privilege grants for data of the predetermined training set of data. This process may be used to learn how to process received information such as user data from users that explicitly approve their information to be processed in one or more operations described herein. Initial training may include reward feedback that may, in some approaches, be implemented using a subject matter expert (SME) that has access to known answers for the predetermined training set of data, e.g., correct data access privilege grants for the predetermined training set of data. However, to prevent costs associated with relying on manual actions of a SME, in another approach, reward feedback may be implemented using techniques for training a Bidirectional Encoder Representations (BERT) model, as would become apparent to one skilled in the art after reading the present disclosure. Once a determination is made that the AI model achieved a redeemed threshold of accuracy of deriving data access privilege grants during this training, a decision that the model is trained and ready to deploy for performing techniques and/or operations of method 300, e.g., operation 302, may be performed. In some further approaches, the AI model may be a neuromyotonic AI model that may improve performance of computer devices in an infrastructure associated with the operations described herein, e.g., such as the predetermined database, because the neuromyotonic AI model may not need a SME and/or iteratively applied training with reward feedback in order to accurately perform operations described herein. Instead, the neuromyotonic AI model is configured to itself make determinations described in operations herein.

In addition to and/or alternative to defining how to organize the data before the data is stored, e.g., data access privilege grants, method 300 may include determining which users and/or user devices will be allowed to access different portions of the data once stored in the predetermined database. For example, in some approaches, method 300 includes determining information about a plurality of users, and assigning, to each of the users, one of the data access privilege grants determined to correlate with the information about the user. In some approaches, method 300 may include maintaining a configurable list of the domain data attributes which may be categorized in various segmented groups such as, but not limited to, e.g., sensitive personal information (SPI) that a user has elected to share based on an expressed opt-in and is able to withdraw sharing of at any time, personal information (PI) that a user has elected to share based on an expressed opt-in and is able to withdraw sharing of at any time, personally identifiable information (PII) that a user has elected to share based on an expressed opt-in and is able to withdraw sharing of at any time, financial information, general, demographics, etc. The domain data attributes may, in some approaches, be determined from user profiles and/or any other information associated with a user. One or more operations of method 300 may use the domain data attribute list by assessing the consumer system database and/or data repository schema and/or data model with applied natural language processing techniques (NLP) and create access privilege grants for data attributes and the data itself. As will become apparent upon reading further descriptions elsewhere below, these grants may be incorporated into metadata that is inbuilt into the data stored in the predetermined database for determining whether to grant a requesting device access to requested data. For example, it may be noted that, in some preferred approaches, method 300 includes assigning the privilege grants to system users and/or user devices to a specific segment of data as per derived roles from a user's profile defined into an enterprise directory or other integrated role-based systems. This way, the data is segmented according to the data access privilege grants, and users are able to access at least some of the segments based on data access privilege grants assigned to the user and/or a device used by the user.

Operation 304 includes segmenting the data according to the data access privilege grants during storage of the data in the predetermined database. In some preferred approaches, each of the segments of data are stored with associated metadata that defines the data access privilege grants associated with the segment of data. The metadata may, in some approaches, further define aspects of an associated segment of the data. For example, in some of such approaches, the metadata may indicate, e.g., timestamp information, logical locations of portions of the segment of data, a start and end location for sequentially reading the data, etc. For each of the segments of data stored to the predetermined database, an associated chunk of metadata may be appended to the segment of data during the storing of the segment of data in the predetermined database. It should be noted that, in some approaches, these segments of the data are columns and/or rows of data that have the same associated data access privilege grant.

Method 300 may base storage of the data in the predetermined database, in some approaches, on data and contractual policies. For example, the type of segmentation incorporated into storage of the data may, in some approaches, be defined by a predetermined organization and/or a predetermined solution consumer system configuration. An effecting data segmentation and/or segregation storage strategy may be derived which adds dynamic support for multi-tenancy or separation of data as per derived data polices. For example, storing the data in the predetermined database may, in some approaches, include physically segmenting the data according to the data access privilege grants during storage of the data in the predetermined database. This segmentation enables data having the same data access privilege grants to be read from a single location during an authorized access to the data. This enables relatively faster read times, as well as relatively less processing being performed in order to read such data than would otherwise be performed if the data was distributed throughout different locations of the predetermined database. In some other approaches, at least some of the data may be logically segmented according to the data access privilege grants during storage of the data in the predetermined database. Furthermore, in some approaches, the data segmentation of method 300 may be integrated with a predetermined data policy system and derive one or more effective data access control rules.

Once at least some of the data is stored in the predetermined database, a data storage system may come online in the sense that the user devices may request to access data, and user devices may be allowed to access requested data in response to a determination being made that the user device is authorized to access the requested data. For example, operation 306 includes receiving, e.g., from a first user device, a query requesting the data stored in the predetermined database. Note that the request may not be for all of the data, in some approaches, but instead be a request for access to at least a portion of the data stored in the predetermined database, e.g., at least some of the data segments stored in the predetermined database. At least some of the metadata is read to identify a segment of the data associated with a data access privilege grant of a user associated with the query, e.g., see operation 308.

The first user device, e.g., the requesting device, is allowed to access the identified segment of data for fulfilling the query, e.g., see operation 310. The identified segment of data may, in some approaches, be a segment of data having appended metadata that indicates a same data access privilege grant as the data access privilege grant indicated in the received request, e.g., a match. In contrast, the first user device is not allowed to access segments of the data that are not associated with the data access privilege grant associated with the query, e.g., see operation 312. In some approaches, it may be determined that no segment of data is identified, e.g., the data access privilege grant indicated in the received request does not match any of the indicated data access privilege grants of metadata appended to the segments of data. In response to no segment of data being identified, a notification may be output to the first user device that indicates that the requesting user and/or the first user device is not authorized to access any of the requested data segments. Approaches for determining whether an owner of a requested segment of data allows a requestor, that is not authorized to access requested data segments, to access data is described elsewhere below.

It should be noted that at least some security measures may be implemented on the segments of data stored in the predetermined database for preventing unauthorized users and/or user devices from accessing segments of data that are not associated with data access privilege grants assigned to the requesting user and/or requesting user device. For example, method 300 optionally includes determining, for each of the segments of data, a degree of security measures to enact in the predetermined database to secure the segment of data and maintaining the different degrees of security measures in the predetermined database. Various examples of security measures which may be implemented in one or more approaches are described below.

In some approaches, the metadata may be used to determine whether the requesting user and/or requesting user device is authorized to access a requested segment of data. For example, assuming that the query request is received from a first user device for a first segment of the data, in some approaches, metadata appended to the first segment of the data may be read to determine whether the first user device is authorized, e.g., according to the data access privilege grants assigned to the user, to access the first segment of data.

Enacting the security measure may additionally and/or alternatively include generating data integrity alerts. For example, in some approaches, the security measure for a first of the segments of data may include generating a data integrity alert for an owner of the first segment of data in response to a determination that an incorrect answer has been received for a data integrity question of the security measure for the first segment of data. The data integrity question may request, e.g., usernames, passwords, encryption keys, etc., that are known and/or provided to authorized users such as users that are assigned an associated one of the data access privilege grants. The data integrity alert preferably indicates that the data integrity question has been answered incorrectly, and may include information associated therewith, e.g., an IP address of the user device that incorrectly answered the data integrity question, etc. The generated data integrity alert may be output to a second user device associated with the owner of the first segment of data in response to a determination that the data integrity question is incorrectly answered. Access to the first segment of data may additionally and/or alternatively be restricted in response to a determination that the data integrity question is incorrectly answered. In some approaches, the access may be restricted until an instruction to withdraw the restricted access is received from the second user device. The proposed data integrity alerts enable an owner of the data to maintain a sensitivity of data and to generate right privilege grants, which also indirectly benefits the quality of the data. For example, assuming that an owner of one of the data segments and/or a user device of a requesting user submits "$1.1 M" as a value in the "USERNAME" data attribute, alerts indicating a failure of the data integrity check may be generated and the access privilege grant for the record may be restricted until the data is corrected or confirmed by the data owner.

The security measures may additionally and/or alternatively include generation and outputting of notification(s) in response to a determination that a first of the data segments requested by the query is not associated with the data access privilege grant associated with the query. For example, in response to a determination that the first data segment requested by the query is not associated with the data access privilege grant associated with the query, a notification may be output to a second user device associated with an owner of the first segment of data to determine whether to allow the first user device access to the first data segment. This not only warns the owner of the first segment of data about an instance of potential unauthorized access, but also enables the user to respond with an indication of how they would like the instance of potential unauthorized access delt with. For example, an answer may be received from the second user device that indicates whether to allow the first user device access to the first data segment. In response to a determination that the answer indicates that the first user device is allowed to access the first data segment, the first user device may be allowed to access the first data segment, e.g., additional data records and/or information may be shared either as real value or obfuscated value in accordance with the data policy grants. In contrast, in response to a determination that the answer indicates that the first user device is not allowed to access the first data segment, the first user device is not allowed to access the first data segment.

It should be noted that various benefits are enabled as a result of implementing the techniques of embodiments and approaches described herein. For example, as a result of causing the data access privilege grants to be derived before the data is stored in a predetermined database, a relatively extensive amount of processing operations that would otherwise be performed to manually sort through data subsequent to data being stored on a predetermined database is eliminated. For example, FTE hours are eliminated, thereby limiting and/or eradicating human intervention in defining roles and its respective scope of operations. This is because such rules are predetermined before storage operations are performed, thereby enabling predefined categories of privilege grants to be inbuilt within the predetermined database and/or a predetermined data repository. These techniques also provide a relatively significant boost to data security owing to different internal storage. This is because security measures are implemented on the data segments. Furthermore, this is because, by segmenting the data according to the data access privilege grants during storage of the data in the predetermined database, the data never resides in the predetermined database without the security measures and access control measures described herein. This also relatively reduces an amount of processing resources that would otherwise be performed, because recovery operations that would otherwise be performed in order to recover from events of unauthorized access are avoided. There is also a value added with respect to customer approval and/or satisfaction in that the data is relatively more secure. Accordingly, relatively easy administering and securing of the data is enabled by defining the roles during an initial phase of data design and by embedding the roles in the data during storage of the data to the predetermined database. It should also be noted that use of the trained AI model to derive the data access privilege grants, and moreover doing so before data is stored in a predetermined database, has heretofore not been considered in conventional techniques and applications. Accordingly, the inventive discoveries disclosed herein proceed contrary to conventional wisdom. These AI techniques furthermore allow scaling of data storage systems to be performed that would not be capable of being performed by a human.

Figure 4:
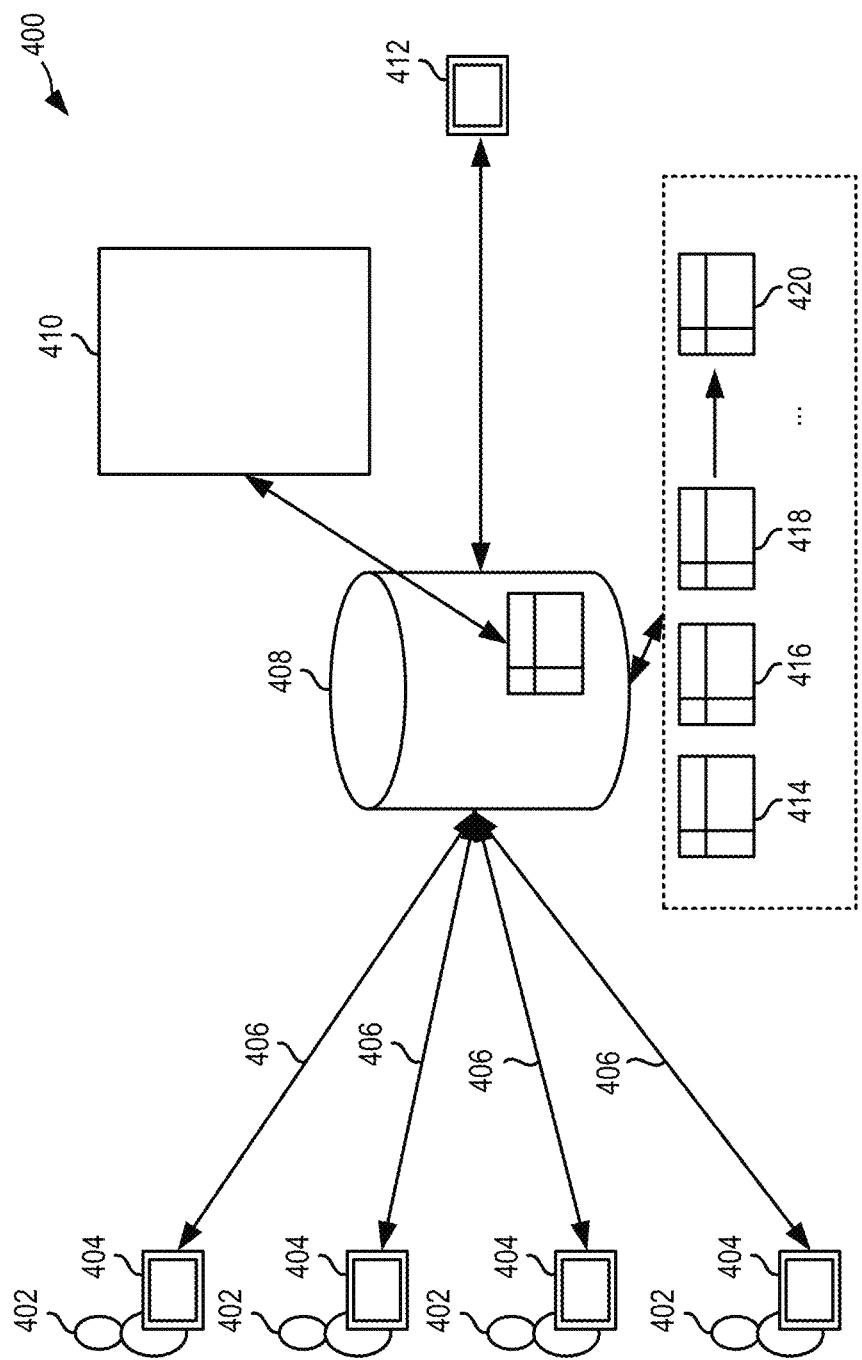
FIG. 4 is a representation of a storage system, in accordance with one embodiment of the present invention.

FIG. 4 depicts a data storage system 400, in accordance with one embodiment. As an option, the present data storage system 400 may be implemented in conjunction with features from any other embodiment listed herein, such as those described with reference to the other FIGS. Of course, however, such data storage system 400 and others presented herein may be used in various applications and/or in permutations which may or may not be specifically described in the illustrative embodiments listed herein. Further, the data storage system 400 presented herein may be used in any desired environment.

The data storage system 400 includes a plurality of users 402 each having an user device 404 associated therewith. The user devices are configured to request, e.g., see request operations 406, data from a predetermined database 408 that is configured to store data and metadata.

Data 410 may be derived before data is stored in the predetermined database. Techniques described herein may be used to derive such grants. The data access privilege grants may, in some approaches, be based on, e.g., database design and/or role definitions which may be specified by owners of the data. In some approaches, an admin 412 of the predetermined database may provide input of rules that are used, e.g., by a trained AI model, to derive the data access privilege grants.

The data may be segmented according to the data access privilege grants during storage of the data in the predetermined database, and metadata that defines the data access privilege grants is stored with the segments of data. For example, the different segments of the data may include, e.g., a first segment of data stored in a first portion of storage 414, a second segment of data stored in a second portion of storage 416, a third segment of data stored in a third portion of storage 418, an $n^{th}$ segment of data stored in an $n^{th}$ portion of storage 420. A query may be received from at least one of the user devices requesting data stored in the predetermined database, and at least some of the metadata may be read to identify a segment of the data associated with a data access privilege grant associated with the query. The requesting user device may be allowed to access the identified segment of data for fulfilling the query.

FIGS. 5A-5C depicts tables 500, 520 and 540, in accordance with several embodiments. As an option, the present tables 500, 520 and 540 may be implemented in conjunction with features from any other embodiment listed herein, such as those described with reference to the other FIGS. Of course, however, such tables 500, 520 and 540 and others presented herein may be used in various applications and/or in permutations which may or may not be specifically described in the illustrative embodiments listed herein. Further, the tables 500, 520 and 540 presented herein may be used in any desired environment.

Referring first to FIG. 5A, table 500 includes a plurality of data access privilege grants derived for data. These data access privilege grants are derived before data is stored in a predetermined database and at least some of the data access privilege grants may be assigned to users and/or user devices. The data access privilege grants are, in some approaches, inbuilt into a predetermined database such that data is segmented according to the data access privilege grants during storage of the data in the predetermined database. This way, an ability is enabled to exercise control at column and row level of data stored in the predetermined database, as opposed to merely being confined at table level.

The data access privilege grants of table 500 include a first data access privilege grant, e.g., see Role A, a second data access privilege grant, e.g., see Role B, a third data access privilege grant, e.g., see Role C, a fourth data access privilege grant, e.g., see Role D, and data that is accessible to a plurality of the roles, e.g., see All role.

Referring now to FIG. 5B, table 520 represents data that is accessible to a user device and/or a user that is assigned the second data access privilege grant, e.g. Role B. For example, it may be noted that data segments associated with the second data access privilege grant, e.g., Role B, and the data that is accessible to a plurality of the roles, e.g., see All role, is accessible in the table 520, while all other data is not accessible, e.g., see No access.

Referring now to FIG. 5C, table 540 represents data that is accessible to a user device and/or a user that is assigned the second data access privilege grant, e.g., Role B, and assigned the fourth data access privilege grant, e.g., see Role D. For example, it may be noted that data segments associated with the second data access privilege grant, e.g. Role B, data segments associated with the fourth data access privilege grant, e.g. Role D, and the data that is accessible to a plurality of the roles, e.g., see All role, is accessible in the table 520, while all other data is not accessible, e.g., see No access.

Figure 6:
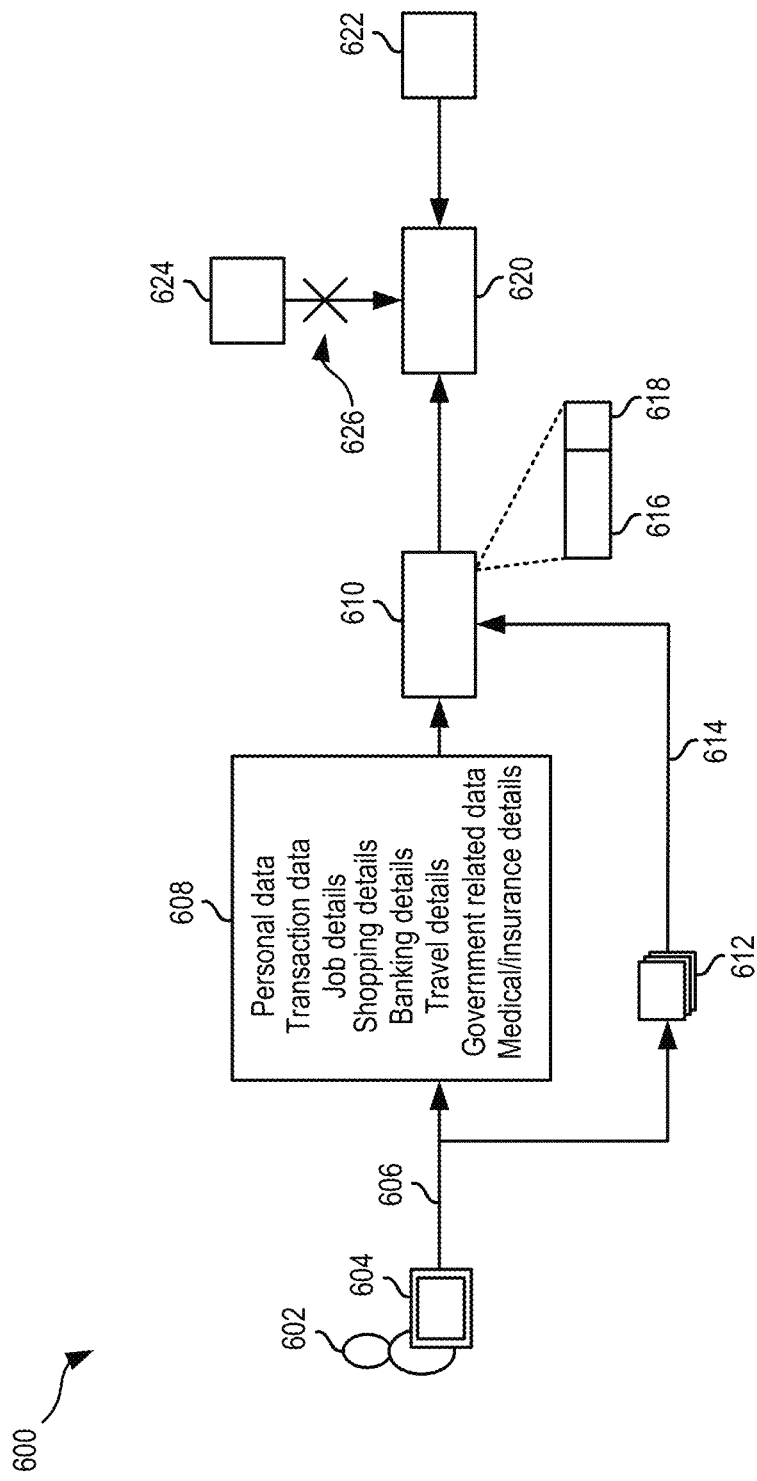
FIG. 6 is a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-10, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 600 illustrates a use case of the techniques described in other embodiments and approaches herein, e.g., see method 300. For example, method 600 illustrates techniques for deriving data access privilege grants before data is stored in a predetermined database. For example, actions, e.g., see access operation 606, of a user 602 and/or actions performed on a user device 604 may be performed with respect to applications, e.g., see application activity 608, to thereby generate data, e.g., see data 610. In some approaches, a plurality of roles 612 may be attached, e.g., see attach operation 614, to the data 610 to thereby derive data access privilege grants before data is stored in a predetermined database. For example, these roles may specify, e.g., collection and incorporation of public social media platform data, not considering emails of the user, not considering short message service (SMS) messages of the user, collection and incorporation of travel agency information, collection and incorporation of bank employee information, collection and incorporation of friends of the user, collection and incorporation of relatives of the user, collection and incorporation of government data, etc. In some approaches, only one of such roles may be attached, e.g., only using government data and/or policies for determining data access privilege grants.

It should be again noted that in embodiments and approaches described herein, any parameters and/or use of user data is preferably only determined and used subsequent to a user, e.g., see user 602, granting permission for their data to be considered. More specifically, this permission is preferably obtained in such a way that the user has the opportunity to consider and review details of how their information will be used (to assist the user in making an informed decision), and thereafter presented with an option to opt-in, e.g., an expressly performed opt-in selection. Thereafter, the user is preferably reminded of their opt-in, and ongoingly presented with features, e.g., output for display on a user device associated with the user, that relatively easily allow the user to retract their previous election to opt-in. Note that these features may be presented to the user in any one or more format, e.g., audibly, visually, braille, in multiple languages, etc. For example, the user may be presented with an unambiguous opt-out selection feature which, if elected by the user, terminates collection and use of data associated with the user, erases previously used data associated with the user, and notifies the user of the course of action taken to respect the user's selection of the opt-out selection feature. In the event that the user does not want to have their data used in one or more of the operations described herein, this decision is respected, and the user is preferably not again presented with such an option unless the user thereafter requests to reconsider the opt-in feature, e.g., based on a change in their decision.

The data is segmented according to the data access privilege grants during storage of the data in the predetermined database, and metadata that defines the data access privilege grants may be stored with the segments of data, e.g., see data segment 616 and metadata 618 appended thereto. For example, in response to receiving a request for data stored in the predetermined database an associated data access privilege grant may enforce access to only data 620 that includes government data, e.g., see access 622, and does not include social media data, e.g., access to social media data 624 is not allowed in operation 626.

Figure 7A:
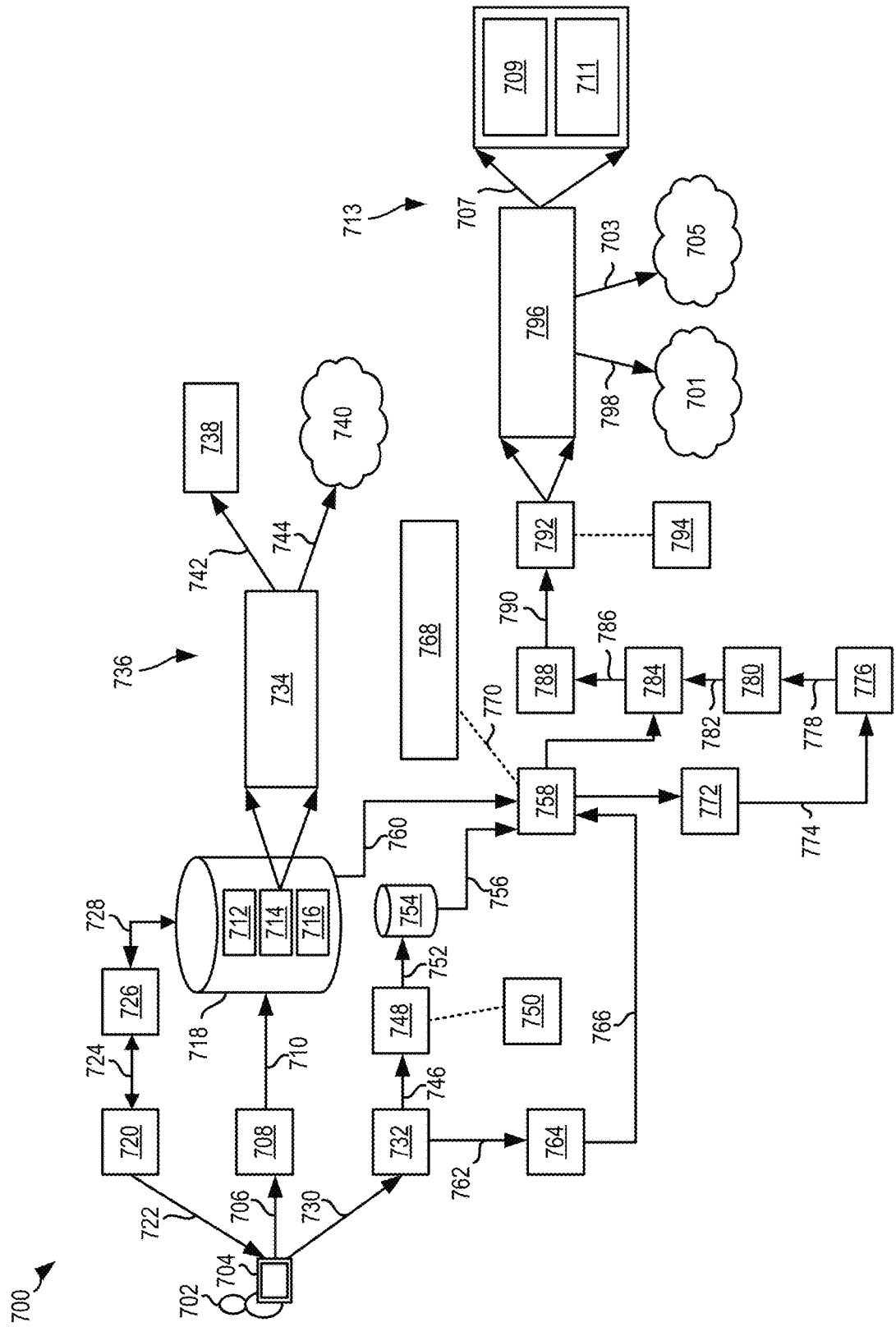
FIG. 7A is a flowchart of a method, in accordance with one embodiment of the present invention.

Now referring to FIG. 7A, a flowchart of a method 700 is shown, according to one embodiment. In FIG. 7A, operations of the flowchart are illustrated with infrastructure components of a system in which method 700 may be performed in some approaches. The method 700 may be performed in accordance with the present invention in any of the environments depicted in FIGS. 1-10, among others, in various embodiments. Of course, more or fewer operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

Furthermore, it may be prefaced that FIGS. 7B-7J illustrate portions of method 700 in further detail, in accordance with several embodiments.

Referring first to FIG. 7A, various operations of method 700 may include defining a table. For example, a user 702 may use a user device 704 to input preferences that are used, e.g., see operation 706, to define a table structure and indicate all field names and data types. For example, the information may be used as input for a predetermined database management system 708, e.g., that includes a trained AI model, to create tables, e.g., see table creation operation 710 that creates a first table 712, a second table 714 and an $n^{th}$ table 716 of a predetermined data repository 718. In some approaches, the user is, e.g., a product manager, an application architect, a cloud architect, a developer, etc.

A data base management system 720 retrieves data, e.g., see operation 722, and creates a table and stores the data inside the internal storage, e.g., see accessing index operation 724 to roles of a tree index 726 to data obtaining operation 728. All column data is preferably stored in same location inside the internal storage, however, in some approaches in which cloud storage is used, a cloud storage application programming interface (API) may send the data and cloud storage nodes store the data. For example, referring momentarily to FIGS. 7B-7D, storage types are illustrated in further detail as structures 736 of the tables and storage before the data access privilege grants are assigned. Specifically, in FIG. 7B, the second table 734 is illustrated with data stored therein, e.g., see name, age and salary distributed among different rows each having a unique row ID. Referring now to FIG. 7C, a call of the service 742 may, in some approaches, produce an on premises storage module 738 with information of the second table. In contrast, referring now to FIG. 7D, a cloud storage API 744 may, in some approaches, be used to access clous storage 740 with information of the second table.

Subsequent to the tables being defined, data access privilege grants may be defined by one or more operations of method 700, e.g., see logical path 730 of method 700. For context, the data access privilege grants may be based on predetermined parameters that are used to derive data access privilege grants 732, according to which the data is segmented and stored to a database. The data access privilege grants may be managed by a manager system (MS), in some approaches. The management system has the option to store all types of data access privilege grants for specific predetermined business requirements. In some approaches, architects or products managers may define the roles, e.g., based on received input. The following fields are defined as part of creating a data access privilege grant, e.g., data access privilege grant name, field name, field types, privileges, etc. The data access privilege grants may be stored inside a repository for future reference, in some approaches.

The MS may in some approaches, be caused, e.g., instructed, to invoke a known type of parser to map table names with the role field names, e.g., see operation 746. This parser is invoked whenever a new table is created inside the database, and may be used to identify information 748, e.g., role name, field types, field names, data, privileges, etc. Note that the data access privilege grants may be defined based on the domain, filed name, and the actual data, in some approaches. Operations described herein may be capable of parsing the data and creating maps to the corresponding data (cells) in the actual tables, with no user interaction required, e.g., see operation 750. For example, in some approaches, predetermined calls are performed, e.g., see operation 762, by a known type of parser 764 in order to parse all the tables and map the roles, e.g., see operation 766.

Operation 752 includes storing the data access privilege grants in a data access privilege grants repository 754. Initially, all the tables and roles for mapping may be obtained and considered for deriving the data access privilege grants. For example, operation 756 includes listing all the roles names and corresponding field names to obtain all the tables and the data access privilege grants, e.g., see operation 758. This process may involve accessing the table definition, e.g., see operation 760.

In some approaches, a natural language classifier of a known type is used to list all possible alternative names of each of the fields in the data access privilege grants. For example, note that the data access privilege grants may consider table 768 in operation 770. The contents of the table 768 are illustrated in further detail in FIG. 7E. A result of these operations may include all the data access privilege grants and data that is to be restricted being determined, e.g., operation 772. The data access privilege grants may be applied to the obtained data. This application may, in some approaches, include classifying the data access privilege grant data, e.g., see operation 774. For example, method 700 may, in some approaches, include iterating through each of the table fields and performing a comparison against the field names generated by natural language classifier 776. This may be used to determine all possible field names, e.g., see operation 778, which may be listed, e.g., see list 780. The comparison is shown in operation 782, and may used to match all possible alternative data with the table data, e.g., see operation 784. In response to a determination that a match exists, e.g., see operation 786, that particular field is marked for roles mapping. Additionally, all the table names and corresponding mapped fields are obtained to collect all similar data in the table, e.g., see operation 788, which may be related to a data access privilege grants mapper component and/or logic 792, e.g., see operation 790. The mapper component is caused to map the physical location of each data access privilege grant mapped field in the table. Here, the mapper component may send cell data, e.g., thereby establishing segments of the data for storage, to specific locations based on the data access privilege grants, e.g., see operation 794. In some approaches, there are two types of storage locations, e.g., a standard location for all the fields, and data access privilege grant based locations.

Figures 7E, 7F, 7G:
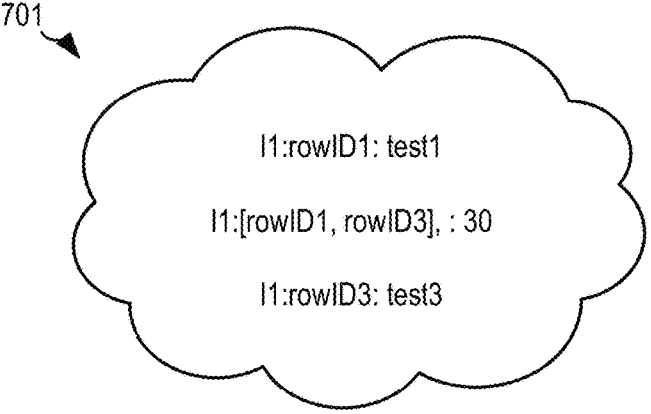

In some approaches, metadata of the table 796 may be updated with data access privilege grant details by concatenating the data access privilege grant name along with column name, e.g., see Name:R1, Age:R1, Salary:R2 of FIG. 7F where R1, R2 are data access privilege grant unique IDs. The rowId of the table data may additionally and/or alternatively be updated by adding the location also in the rowId, e.g., I1_rowId, I2_rowId where I1, I2 are physical blocks address or cloud storage credentials and address.

Figure 7H:
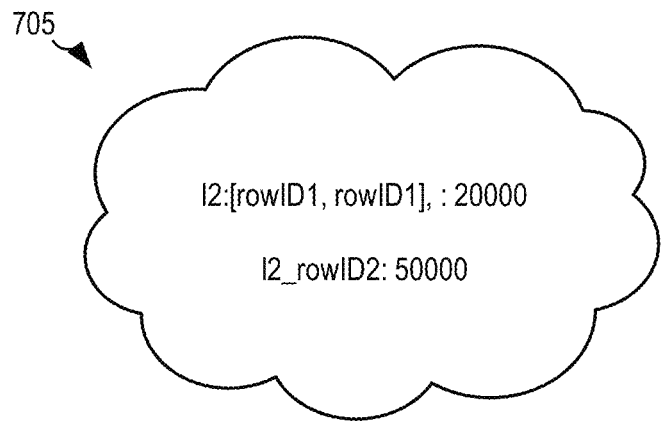
Figure 7I:
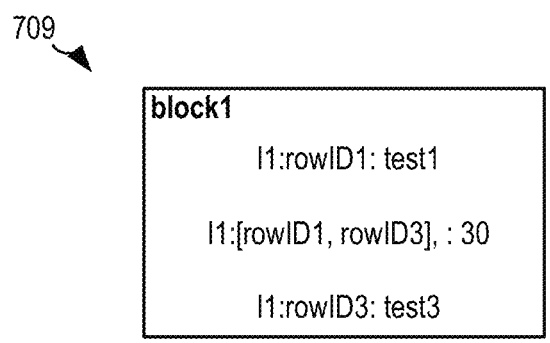
Figure 7J:
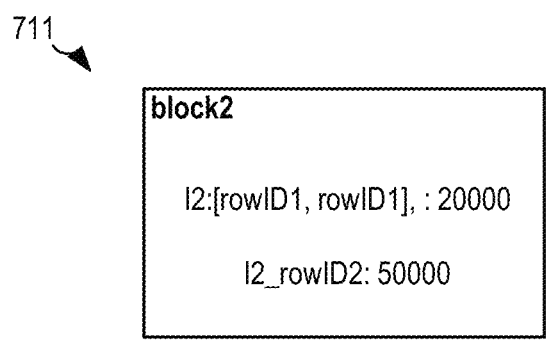

Referring now to a portion 713 of FIG. 7A that defines a structure of the table and storage after the assignment of the data access privilege grants, each of the data access privilege grant based columns may be stored in different locations in the internal storage of the database. For example, in some approaches in which the storage is cloud, then each of the data access privilege grant based field data may be stored in different cloud locations by calling cloud storage APIs specific to that location, e.g., see cloud API 798 to store segments of the data to a first location of cloud storage 701 and secure cloud API 703 to store segments of the data to a second location of cloud storage 705. Note that, the contents of the first location of cloud storage 701 are illustrated in FIG. 7G and the contents of the second location of cloud storage 705 are illustrated in FIG. 7H. In contrast, for some approaches in which the storage is on-premises, the field data is stored in different blocks of storage, e.g., see operation 707. For example, FIG. 7A includes a first block of on-premises storage 709 and second secure block of on-premises storage 711. Note that, the contents of the first block of on-premises storage 709 is illustrated in FIG. 7I, the contents of the second secure block of on-premises storage 711 is illustrated in FIG. 7J.

Figure 8:
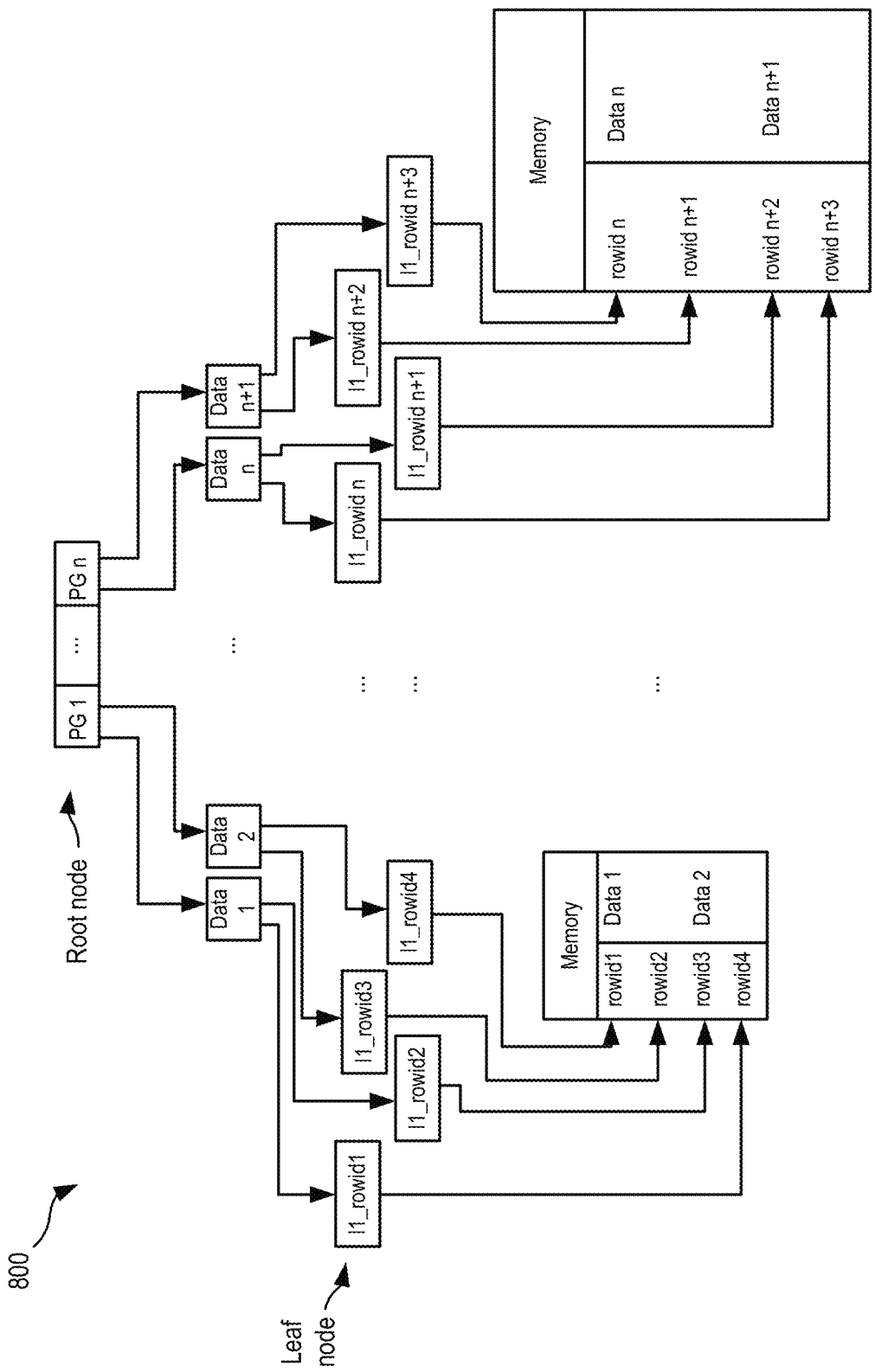
FIG. 8 is a representation, in accordance with one embodiment of the present invention.

FIG. 8 depicts a representation 800 of the data stored in segments according to the data access privilege grants, in accordance with one embodiment. As an option, the present representation 800 may be implemented in conjunction with features from any other embodiment listed herein, such as those described with reference to the other FIGS. Of course, however, such representation 800 and others presented herein may be used in various applications and/or in permutations which may or may not be specifically described in the illustrative embodiments listed herein. Further, the representation 800 presented herein may be used in any desired environment.

Once the data is stored, the data is indexed using the data access privilege grants instead of actual data. A query requesting data stored in the predetermined database may be received from a first user device. In order to retrieve the requested data, in some approaches, the B+ tree of representation 800 may be used to generate indexes. For example, a root node, e.g., see Root node, may contain all the indexes in the database. A first branch contains the fields mapped with the roles, the fields of roles spread across multiple tables. The leaf node, e.g., see Leaf node, contains all the actual data with the mapping of <location_address>_rowId, that internally connects to the physical location of the storage. The data is accessed through database queries or using the database tools directly by accessing the index. Indexes may store all the frequently accessed data and send the data immediately upon receiving the request. Indexes are, in some preferred approaches, updated periodically with the latest updates in the repository.

FIGS. 9A-9B depict representations 900 and 950, in accordance with several embodiments. As an option, the present representations 900 and 950 may be implemented in conjunction with features from any other embodiment listed herein, such as those described with reference to the other FIGS. Of course, however, such representations 900 and 950 and others presented herein may be used in various applications and/or in permutations which may or may not be specifically described in the illustrative embodiments listed herein. Further, the representations 900 and 950 presented herein may be used in any desired environment.

Referring first to FIG. 9A, representation 900 is a data representation that is based on various data access privilege grants. For example, the representation 900 includes data that is segmented and stored according to the different data access privilege grants, e.g., see access to private firm only, access to all, etc. Representation 950 of FIG. 9B is another data representation. In some approaches, each cell is actual data. For example, name, address, phone number etc. These illustrations represent the accessibility to data, individuals and/or entities with grants to view or access the data, and the amount of protected data. In some approaches, there may be public grants, e.g., such as government grants and private grants such as to family, friends. In some other approaches, grants may be created by the data owner and attached to the data when the owner generates the data. Furthermore, in some approaches, an owner may use public grants or private grants while generating the data. Private grants can be merged with public grants, in some approaches.

Figure 10:
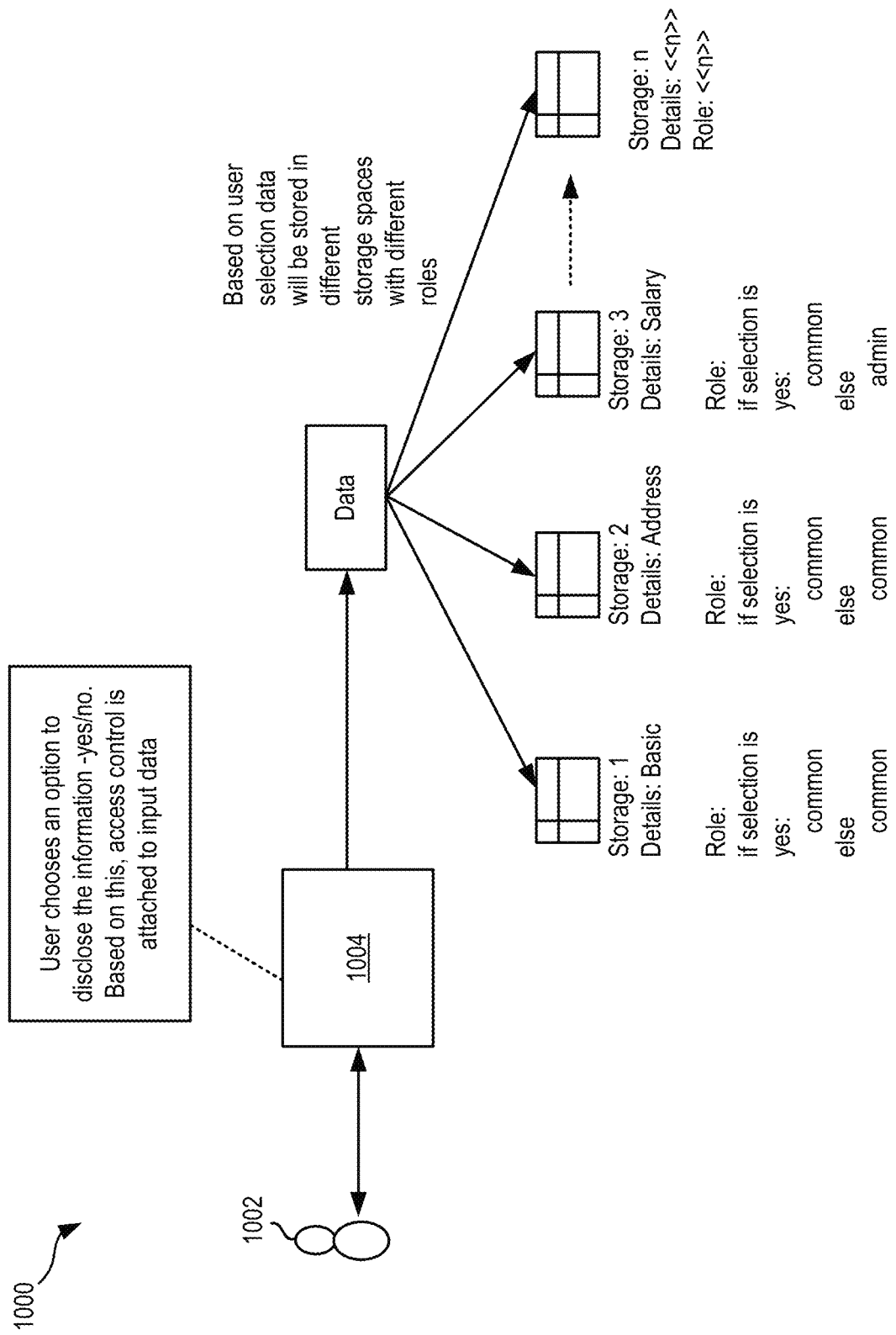
FIG. 10 is a flowchart of a method, in accordance with one embodiment of the present invention.

Now referring to FIG. 10, a flowchart of a method 1000 is shown, according to one embodiment. The method 1000 may be performed in accordance with the present invention in any of the environments depicted in FIGS. 1-10, among others, in various embodiments. Of course, more or fewer operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

In FIG. 10, a user 1002 is enabled to choose an option with respect to whether or not they are comfortable disclosing their information in a user interface 1004. For example, the user is presented with an option to disclose such information, e.g., yes or no. Based on this selection, access control is attached to input data. Furthermore, based on the user selection, data will be stored either with common role or admin role, e.g., see "common" and "admin" metadata indicators in the different segments of data stored in a database. Here, control of the data is provided to the user such that if the user thereafter decides that they no longer wish for their data to be known or incorporated in the database described herein, the user is able to revoke the authorization allowing the use of their data. Subsequently, the user's data may be erased in accordance with their wishes.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
inputting data intended for storage into a trained artificial intelligence (AI) model to derive data access privilege grants for the data before the data is stored in predetermined storages, wherein user information for training the trained AI model is selected from among profile information of a given user, credentials held by the given user, usernames of the given user, strength of a password used by the given user, experience with a predetermined subject of the given user, demographic information of the given user, personally identifiable information of the given user, and financial information of the given user;
in response to deriving the data access privilege grants for the data and prior to storing the data, segmenting the data to correspond to the data access privilege grants as segments of the data are being stored according to the data access privilege grants in the predetermined storages, wherein metadata that defines the data access privilege grants is stored with the segments of the data;
receiving, from a first user device, a query requesting the data stored in the predetermined storages;
reading at least some of the metadata to identify a segment of the data associated with a data access privilege grant associated with the query; and
allowing the first user device to access the identified segment of data for fulfilling the query.

2. The computer-implemented method of claim 1, comprising: not allowing the first user device to access segments of the data that are not associated with the data access privilege grant associated with the query.

3. The computer-implemented method of claim 1, wherein the data access privilege grants are based on parameters selected from the group consisting of: data attributes, profile information of a data requestor, demographic information of a data requestor, and a relative sensitivity of associated data.

4. The computer-implemented method of claim 1, wherein the data is physically segmented according to the data access privilege grants during storage of the data in the predetermined storages.

5. The computer-implemented method of claim 1, wherein the data is logically segmented according to the data access privilege grants during storage of the data in the predetermined storages.

6. The computer-implemented method of claim 1, comprising: determining, from user profiles, information about a plurality of users; and assigning, to each of the users, one of the data access privilege grants determined to correlate with the information about the user.

7. The computer-implemented method of claim 1, comprising: determining, for each of the segments of data, a degree of security measures to enact in the predetermined storages to secure the segment of data; and maintaining the different degrees of security measures in the predetermined storages.

8. The computer-implemented method of claim 7, wherein enacting the security measure for a first of the segments of data includes: generating a data integrity alert for an owner of the first segment of data in response to a determination that an incorrect answer has been received for a data integrity question of the security measure for the first segment of data; outputting the generated data integrity alert to a second user device associated with the owner of the first segment of data; and restricting access to the first segment of data until an instruction to withdraw the restricted access is received from the second user device.

9. The computer-implemented method of claim 7, wherein a first of the data segments requested by the query is not associated with the data access privilege grant associated with the query, and comprising: in response to a determination that the first data segment requested by the query is not associated with the data access privilege grant associated with the query, outputting a notification to a second user device associated with an owner of the first segment of data to determine whether to allow the first user device access to the first data segment; receiving an answer from the second user device that indicates whether to allow the first user device access to the first data segment; and in response to a determination that the answer indicates that the first user device is allowed to access the first data segment, allowing the first user device to access the first data segment.

10. A computer program product, the computer program product comprising a computer readable storage medium having program instructions embodied therewith, the program instructions executable by a computer to cause the computer to:

input, by the computer, data intended for storage into a trained artificial intelligence (AI) model to derive data access privilege grants for the data before the data is stored in predetermined storages, wherein user information for training the trained AI model is selected from among profile information of a given user, credentials held by the given user, usernames of the given user, strength of a password used by the given user, experience with a predetermined subject of the given user, demographic information of the given user, personally identifiable information of the given user, and financial information of the given user;

in response to deriving the data access privilege grants for the data and prior to storing the data, segment, by the computer, the data to correspond to the data access privilege grants as segments of the data are being stored according to the data access privilege grants in the predetermined storages, wherein metadata that defines the data access privilege grants is stored with the segments of the data;

receive, by the computer from a first user device, a query requesting the data stored in the predetermined storages;

read, by the computer, at least some of the metadata to identify a segment of the data associated with a data access privilege grant associated with the query; and allow, by the computer, the first user device to access the identified segment of data for fulfilling the query.

11. The computer program product of claim 10, comprising the program instructions executable by the computer to cause the computer to: not allow, by the computer, the first user device to access segments of the data that are not associated with the data access privilege grant associated with the query.

12. The computer program product of claim 10, wherein the data access privilege grants are based on parameters selected from the group consisting of: data attributes, profile information of a data requestor, demographic information of a data requestor, and a relative sensitivity of associated data.

13. The computer program product of claim 10, wherein the data is physically segmented according to the data access privilege grants during storage of the data in the predetermined storages.

14. The computer program product of claim 10, wherein the data is logically segmented according to the data access privilege grants during storage of the data in the predetermined storages.

15. The computer program product of claim 10, comprising the program instructions executable by the computer to cause the computer to: determine, by the computer, from user profiles, information about a plurality of users; and assign, by the computer, to each of the users, one of the data access privilege grants determined to correlate with the information about the user.

16. The computer program product of claim 10, comprising the program instructions executable by the computer to cause the computer to: determine, by the computer, for each of the segments of data, a degree of security measures to enact in the predetermined storages to secure the segment of data; and maintain, by the computer, the different degrees of security measures in the predetermined storages.

17. The computer program product of claim 16, wherein enacting the security measure for a first of the segments of data includes: generating a data integrity alert for an owner of the first segment of data in response to a determination that an incorrect answer has been received for a data integrity question of the security measure for the first segment of data; outputting the generated data integrity alert to a second user device associated with the owner of the first segment of data; and restricting access to the first segment of data until an instruction to withdraw the restricted access is received from the second user device.

18. The computer program product of claim 16, wherein a first of the data segments requested by the query is not associated with the data access privilege grant associated with the query, and comprising the program instructions executable by the computer to cause the computer to: in response to a determination that the first data segment requested by the query is not associated with the data access privilege grant associated with the query, output, by the computer, a notification to a second user device associated with an owner of the first segment of data to determine whether to allow the first user device access to the first data segment; receive, by the computer, an answer from the second user device that indicates whether to allow the first user device access to the first data segment; and in response to a determination that the answer indicates that the first user device is allowed to access the first data segment, allow, by the computer, the first user device to access the first data segment.

19. A system, comprising:
a hardware processor; and
logic integrated with the processor, executable by the processor, or integrated with and executable by the processor, the logic being configured to:
input data intended for storage into a trained artificial intelligence (AI) model to derive data access privilege grants for the data before the data is stored in predetermined storages, wherein user information for training the trained AI model is selected from among profile information of a given user, credentials held by the given user, usernames of the given user, strength of a password used by the given user, experience with a predetermined subject of the given user, demographic information of the given user, personally identifiable information of the given user, and financial information of the given user;
in response to deriving the data access privilege grants for the data and prior to storing the data, segment the data to correspond to the data access privilege grants as segments of the data are being stored according to the data access privilege grants in the predetermined storages, wherein metadata that defines the data access privilege grants is stored with the segments of the data;
receive, from a first user device, a query requesting the data stored in the predetermined storages;
bread at least some of the metadata to identify a segment of the data associated with a data access privilege grant associated with the query; and
allow the first user device to access the identified segment of data for fulfilling the query.

20. The system of claim 19, comprising the logic being configured to: not allow the first user device to access segments of the data that are not associated with the data access privilege grant associated with the query.

* * * * *